United States Patent [19]

Bushman

[11] Patent Number: 5,420,588
[45] Date of Patent: May 30, 1995

[54] WAVE ATTENUATION

[76] Inventor: Boyd B. Bushman, Lockheed Corporation, Fort Worth Division, Box 748 - MZ 5965, Fort Worth, Tex. 76101

[21] Appl. No.: 48,252
[22] Filed: Apr. 14, 1993
[51] Int. Cl.$^6$ .................. H01Q 17/00; G01S 7/38
[52] U.S. Cl. ............................. 342/2; 342/4; 342/13
[58] Field of Search .............. 342/1, 2, 3, 4, 5, 6, 342/12, 13, 16

[56] References Cited

U.S. PATENT DOCUMENTS

| | | | |
|---|---|---|---|
| 3,713,157 | 1/1973 | August | 342/2 |
| 4,019,699 | 4/1977 | Wintersdorff et al. | 244/121 |
| 4,030,098 | 6/1977 | Nahmias | 342/2 |
| 4,047,174 | 9/1977 | Wohlers | 342/5 |
| 4,606,848 | 8/1986 | Bond | 252/511 |
| 4,686,150 | 8/1987 | Talley et al. | 342/5 X |
| 4,949,095 | 8/1990 | Neil et al. | 342/5 X |
| 4,987,418 | 1/1991 | Kosowsky et al. | 342/6 |
| 4,989,006 | 1/1991 | Roth | 342/1 |
| 5,036,323 | 7/1991 | Cain et al. | 342/6 |
| 5,307,068 | 4/1994 | Hartemann | 342/1 |
| 5,307,081 | 4/1994 | Hamuth | 342/1 X |

*Primary Examiner*—John B. Sotomayor
*Attorney, Agent, or Firm*—James E. Bradley

[57] ABSTRACT

A radar cross-section reduction system utilizes a charging device for creating a high positive DC static potential on an object such as an aircraft. The charging system is mounted to the object so that this DC potential would be applied to the outer skin or surface of the object. The charging system includes Van de Graaf generators located in housings attached to the object. Each Van de Graaf generator has two pulleys about which a belt is rotated. One of the pulleys and the belt are nonconductors, while the other pulley is a conductor. This results in a buildup of positive charges at one end of the belt and negative charges at the other end. The negative charges are picked off and applied to a ground section. The positive charges are picked off and applied to a collector. The collector is in electrical continuity with the outer structure of the object. Negative dissipators attached to the ground section dissipate the excess negative charges during flight. Positive dissipators may be selectively switched into engagement with the skin to dissipate the positive charge on the skin prior to landing.

35 Claims, 2 Drawing Sheets

WAVE ATTENUATION

BACKGROUND OF INVENTION

1. Field of Invention

This invention relates in general to techniques for reducing radar cross-section, and in particular to a system which reduces radar cross-section by providing a high DC static potential on the object.

2. Description of the Prior Art

Military objects, such as aircraft, are vulnerable to being detected by radar. There have been many proposals in the past for reducing the radar reflectivity or cross-section of the aircraft. For example, special contours and shapes on the leading edges of the aircraft will reduce radar cross-section. However, often these special shapes result in disadvantages in the aeronautical performance of the aircraft. Special coatings and layers can reduce radar reflection by absorbing electromagnetic waves transmitted from a radar transmitter. Coatings add weight to the aircraft, and also weather and require maintenance. Additionally, coatings do not reduce the radar cross-section as much as desired.

SUMMARY OF THE INVENTION

In this invention, the radar cross-section of the object is reduced by applying a high positive DC static potential to the outer surface or skin of the object. The DC potential is preferably above 200,000 volts. The high DC potential reduces the reflectivity of radar electromagnetic waves from a radar transmitter.

One method for applying the DC potential is by mounting at least one Van de Graaf generator to the object. Van de Graaf generators are well-known devices, used primarily for experimental and educational purposes. A Van de Graaf generator has a belt that is engaged at one end by a rotating pulley of nonconductive material, such as a plastic, and the other engaged by a rotating pulley of a conductive material, such as aluminum. One of the pulleys is driven to rotate the belt. Frictional rubbing between the belt and pulleys occurs due to the curvature of the belt as it passes around the pulleys. The rotation of the belt rotates creates a static potential. A positive brush at one end picks up the positive charges from the belt and deposits them on a metal collector or dome. A negative brush at the other end picks off the negative charges from the belt and deposits them on a ground section. The charges can accumulate up to a high level, typically 200,000 volts.

In application to an aircraft, a number of Van de Graaf generators are mounted in a housing or pod attached to each wing. The collector locates at the forward end and the ground section locates at the rearward end in the shape of a fin. The collector is in electrical contact with the outer skin of the wing. The combined Van de Graaf generators create voltages in excess of 200,000 volts. The high DC potential is applied uniformly throughout the skin of the aircraft.

Negative dissipators or wires are attached to the ground section. During flight, the air stream flowing past the dissipators will cause the negative charges to dissipate from the ground section.

Also, to discharge the high static potential on the aircraft before it lands, preferably positive dissipators are also mounted to the aircraft trailing edges. The positive dissipators are separated by an insulator section so that they do not function to dissipate the positive charges unless connected by the closing of a switch. The switch, when closed, connects the positive dissipators to the skin of the aircraft to dissipate positive charges during flight. The switch is controlled by the pilot or by the aircraft flight control system.

DETAILED DESCRIPTION OF INVENTION

Figure 1:
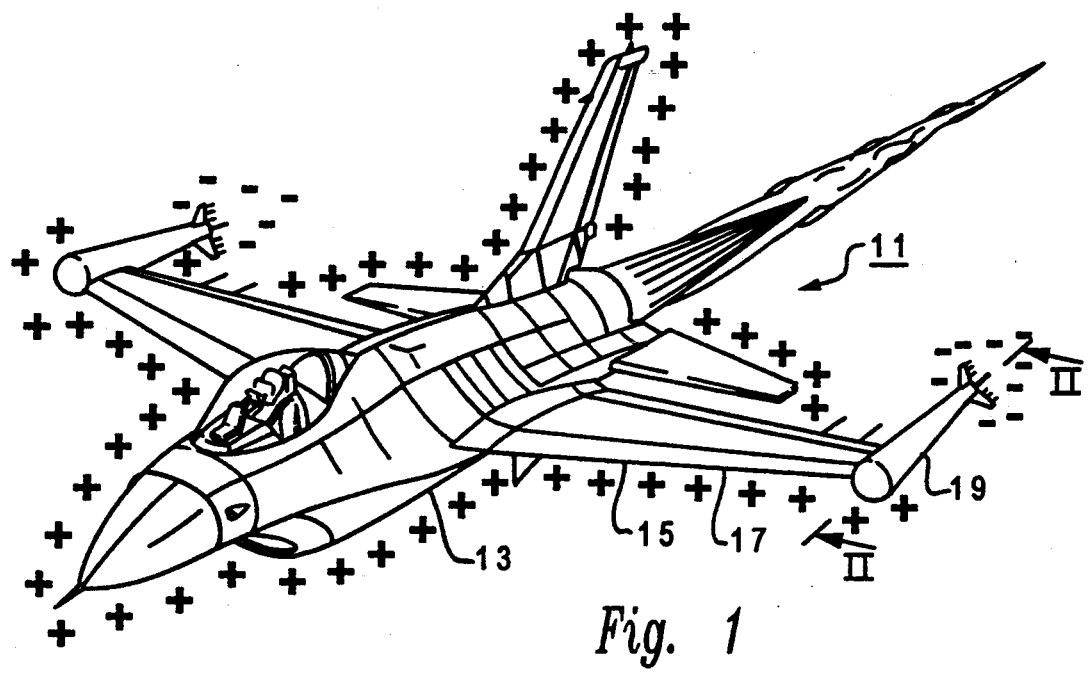
FIG. 1 shows an aircraft having a radar cross-section reducing system constructed in accordance with this invention.

Referring to FIG. 1, aircraft 11 is a military fighter plane, having a fuselage 13 and wings 15. Aircraft 11 is covered with a skin 17, at least a portion of which is electrically conductive and typically of aluminum.

Figure 2:
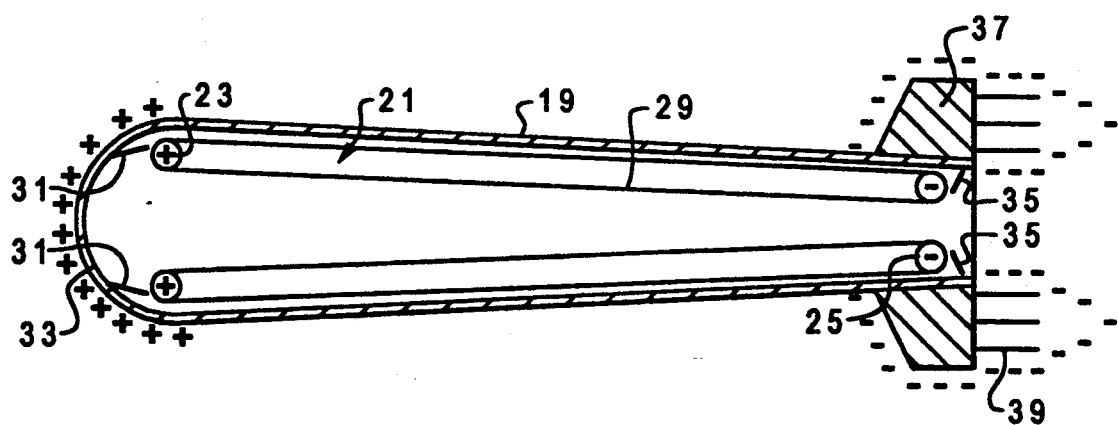
FIG. 2 is a sectional view, partially schematic, of part of the radar cross-section reducing system of FIG. 1, taken along the line II—II of FIG. 1.
Figure 3:
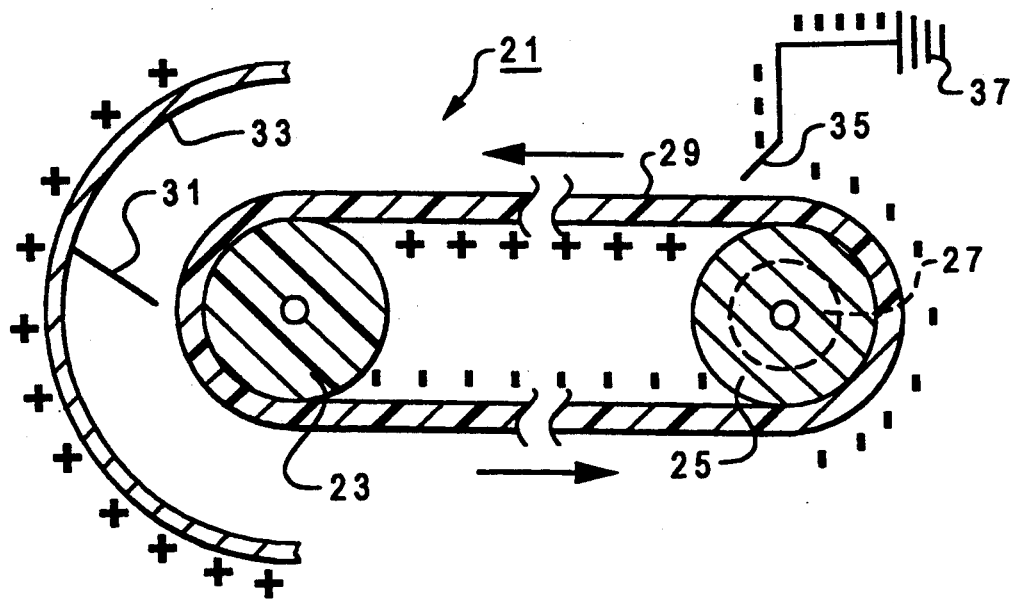
FIG. 3 is a schematic representation of a Van de Graaf generator of a type used with the radar cross-section reducing system of FIG. 1.

A housing 19 of an electrical insulator material is mounted to the tip of each wing 15. Housing 19 is in the shape of a pod, and is illustrated in more detail in FIG. 2. Housing 19 contains four Van de Graaf generators 21 (only parts of two shown). Each Van de Graaf generator 21, as illustrated in FIG. 3, includes a pulley 23 of an electrically insulating material, such as a plastic. A pulley 25 is located opposite pulley 23, pulley 25 being of an electrically conductive material such as aluminum. One of the pulleys 23, 25, shown to be pulley 25, is driven by an electric motor 27, shown in phantom. A belt 29 of insulator material, such as rubber, extends around the pulleys 23, 25.

A positive brush 31 comprising small flexible electrodes is in close proximity to but not in contact with the belt 29 adjacent to pulley 23. Positive brush 31 is electrically connected to a collector 33. Collector 33 is a metal dome-shaped object. A negative brush 35 locates in close proximity to but not in contact with belt 29 adjacent pulley 25. Negative brush 35 is connected electrically by a wire to a ground section 37. Ground section 37 comprises two or more flat fins, as shown in FIG. 1 and FIG. 2. As shown and FIG. 1 and FIG. 2, a plurality of negative dissipators 39 are attached electrically to the ground section 37. Negative dissipators 39 are small straight rods or wires that extend rearward from the ground section 37.

Ground section 37 is insulated from the skin 17 of wings 15 by the insulated housing 19. Collector 33 serves as the collector for all four of the Van de Graaf generators 21. Collector 33 is physically touching a part of the skin 17, making skin 17 and collector 33 in electrical continuity with each other.

Figure 4:
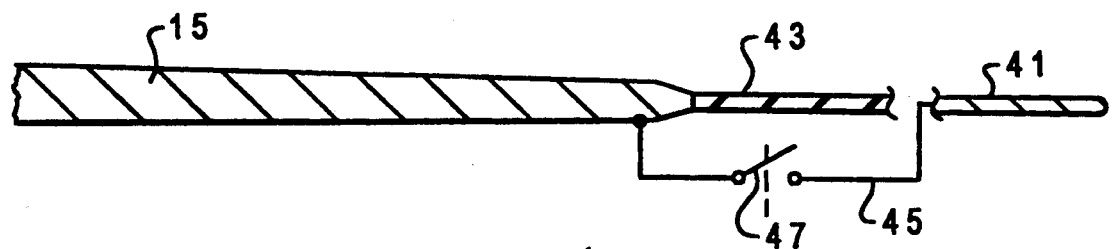
FIG. 4 is a schematic sectional view illustrating one of the positive charge dissipators of the radar cross-section reducing system of FIG. 1.

A plurality of positive dissipators 41 extend rearward from the trailing edges of wings 15. Positive dissipators 41, as shown in FIG. 4, comprise straight wires or rods similar to negative dissipators 39. However, positive dissipators 41 are not in electrical continuity with the skin 17 of wings 15 at all times. An insulator section 43 electrically insulates positive dissipators 41 from skin 17. A wire 45, shown schematically in FIG. 4, will connect positive dissipators 41 electrically to skin 17 at wings 15. A switch 47, which is actuated by the pilot or a control system of aircraft 11, will selectively open and close wire 45.

In operation, motor 27 of each Van de Graaf generator 21 is driven to rotate belt 29. Both plastic pulley 23 and belt 29 are electrical insulators. Consequently, when rubbed against each other, one loses electrons to the other. Rubbing occurs due to the rotation of belt 29 around the pulleys 23, 25 as the pulleys 23, 25 rotate. Positive charges accumulate at pulley 23. Belt 29 acquires the positive charges at pulley 23, which are picked off by the positive brush 31 and deposited on the collector 33. Negative charges accumulate at pulley 25, and are transferred to belt 29 and picked off by the negative brush 35. As belt 29 continues to rotate, charges continue to deposit on the pulleys 23, 25 and thus on the collector 33 and ground section 37. The belt 29 transports negative charges from the pulley 23 back to the ground section 37 as the positive charges build up.

The positive charges spread out over the collector 33 and over the aircraft skin 17 due to electrostatic repulsion. The charges will thus be uniformly distributed over the electrically conductive portions of skin 17. This buildup of positive charge continues until an ionization intensity is reached. Once this is reached, the air in housing 19 behind the collector 33 becomes ionized, causing a discharge. Continuous rotation quickly restores the high DC potential on the aircraft skin 17. A large number of positive charges will build up on collector 33, in excess of 200,000 volts. The multiple Van de Graaf generators 21 feeding the single collector 33 can increase the voltage beyond that of a single Van de Graaf generator 21. Voltages on skin 17 in excess of 800,000 volts are desired.

Tests with a model and a single Van de Graaf generator 21 have been conducted. These tests have been conducted wherein the model had achieved approximately 200,000 volts of positive DC static potential. The tests showed that the radar cross-section of the model was reduced from 3 to 15 decibels.

The radar cross-section reduction is thus independent of flight. In flight, the negative dissipators 39 will continue to dissipate the buildup of negative charges on the ground section 37. The positive dissipators 41 will not have any effect until the pilot or flight control system desires to remove the DC static charge from the skin 17. At that point, the pilot will turn off the Van de Graaf generators 21. A high positive charge will still remain on the skin 17, however. The pilot or the control system actuates switch 47 which electrically connects positive dissipators 41 to skin 17 through wire 45. The positive charges will then dissipate through the positive dissipators 41 due to the high speed air stream flowing past the aircraft 11 as it continues flight.

It is not completely clear why the radar cross-section is reduced by the high DC potential. A theory is that in order to have good reflectivity of radar, free negative electrons need to be readily available on the object. If a high positive charge has been applied to the object, the negative electrons will not be free and present when electromagnetic radar waves strike the object. Consequently, the radar cross-section or reflectivity is reduced. The electromagnetic waves from a radar transmitter are attenuated upon striking the object.

The invention has significant advantages. Considerable reduction in radar cross-section has been achieved with the application of the high positive static charge. The equipment used to apply the charge is relatively light in weight and not complex. The high static charge, having no current, poses no danger to humans or to other equipment on the aircraft.

While the invention has been shown in only one of its forms, it should be apparent to those skilled in the art that it is not so limited but is susceptible to various changes without departing from the scope of the invention.

I claim:

1. An apparatus for reducing radar reflectivity of an object which has an outer structure, comprising in combination:

static charge means for creating a positive DC static potential; and mounting means for mounting the static charge means to the object for applying the DC static potential to at least a selected portion of the outer structure of the object.

2. The apparatus according to claim 1 wherein the positive DC static potential is in excess of 200,000 volts.

3. The apparatus according to claim 1 wherein the object is an aircraft, and wherein the outer structure comprises skin of the aircraft.

4. The apparatus according to claim 1 wherein the static charge means comprises at least one Van de Graaf generator.

5. The apparatus according to claim 1 wherein the static charge means comprises:

a pair of pulleys, one of the pulleys being driven, one of the pulleys being of an electrical insulator material and the other of the pulleys being of an electrical conductive material;

a belt of an electrical insulator material extending around the pulleys, which when rotated by the driven pulley, creates positive charges at a positive end of the belt and negative charges at a negative end of the belt;

a collector in electrical continuity with said at least a selected portion of the outer structure of the object;

positive brush means at the positive end of the belt for picking off the positive charges and applying them to the collector; and negative brush means at the negative end of the belt for picking off the negative charges and applying them to an electrical ground.

6. The apparatus according to claim 1 wherein the static charge means comprises:

a pair of pulleys, one of the pulleys being driven, one of the pulleys being of an electrical insulator material and the other of the pulleys being of an electrical conductive material;

a belt of an electrical insulator material extending around the pulleys, which when rotated by the driven pulley, creates positive charges at a positive end of the belt and negative charges at a negative end of the belt;

a collector located adjacent the positive end of the belt and in electrical continuity with said at least a selected portion of the outer structure of the object;

a ground section located adjacent the negative end of the belt and isolated electrically from the outer structure of the object;

positive brush means at the positive end of the belt for picking off the positive charges and applying them to the collector; and negative brush means at the negative end of the belt for picking off the negative charges and applying them to the ground section.

7. The apparatus according to claim 1 wherein the object is an aircraft, the outer structure comprises skin of the aircraft, and wherein:
the static charge means comprises at least one generator having a collector which accumulates positive charges and a ground section which accumulates negative charges; and
the mounting means mounts the collector in electrical continuity with at least a portion of the skin of the aircraft, and mounts the ground section electrically isolated from the skin of the aircraft.

8. The apparatus according to claim 1 wherein the object is an aircraft, the outer structure comprises skin of the aircraft, and wherein:
the static charge means comprises at least one generator having a collector which accumulates positive charges and a ground section which accumulates negative charges; and
the mounting means mounts the collector in electrical continuity with at least a portion of the skin of the aircraft, and mounts the ground section electrically isolated from the skin of the aircraft; and wherein the apparatus further comprises:
at least one negative charge dissipating rod extending rearward from the ground section for dissipating negative electrical charges during flight of the aircraft.

9. The apparatus according to claim 1 wherein the object is an aircraft, the outer structure comprises skin of the aircraft, and wherein the apparatus further comprises:
at least one positive charge dissipating rod extending rearward from a portion of the aircraft; and
switch means for electrically disconnecting the positive charge dissipating rod from the skin when the positive DC static potential is desired on the aircraft, and for electrically connecting the positive charge dissipating rod to the skin during flight when it is desired to remove the positive DC static potential from the skin of the aircraft.

10. The apparatus according to claim 1 wherein the object is an aircraft, the outer structure comprises skin of the aircraft, and wherein:
the static charge means comprises at least one generator having a collector which accumulates positive charges and a ground section which accumulates negative charges; and
the mounting means mounts the collector in electrical continuity with at least a portion of the skin of the aircraft, and mounts the ground section electrically isolated from the skin of the aircraft; and wherein the apparatus further comprises:
at least one negative charge dissipating rod extending rearward from the ground section for dissipating negative electrical charges during flight;
at least one positive charge dissipating rod extending rearward from a portion of the aircraft; and
switch means for electrically disconnecting the positive charge dissipating rod from the skin when the positive DC static potential is desired on the aircraft, and for electrically connecting the positive charge dissipating rod to the skin during flight when it is desired to remove the positive DC static potential from the skin of the aircraft.

11. An apparatus for reducing radar reflectivity of an object which has an outer structure, comprising in combination:
at least one Van de Graaf generator which when driven accumulates positive charges in excess of 200,000 volts, applies the positive charges to a collector, and has a ground section which accumulates negative charges; and
mounting means for mounting the Van de Graaf generator to the object with the collector in electrical continuity with at least a portion of the outer structure of the object to apply the positive charges to said at least a portion of the outer structure and with the ground section electrically isolated from the outer structure.

12. The apparatus according to claim 11 wherein the Van de Graaf generator comprises:
a pair of pulleys, one of the pulleys being driven, one of the pulleys being of an insulator material and the other of the pulleys being of an electrical conductive material;
a belt of an insulator material extending around the pulleys, which when rotated by the driven pulley, creates positive charges at a positive end of the belt and negative charges at a negative end of the belt;
positive brush means at the positive end of the belt for picking off the positive charges and applying them to the collector; and
negative brush means at the negative end of the belt for picking off the negative charges and applying them to the ground section.

13. The apparatus according to claim 11 wherein the object is an aircraft, the outer structure comprises skin of the aircraft, and wherein the apparatus further comprises:
at least one positive charge dissipating rod extending rearward from a portion of the aircraft; and
switch means for electrically disconnecting the positive charge dissipating rod from the skin when the positive DC static potential is desired on the aircraft, and for electrically connecting the positive charge dissipating rod to the skin during flight when it is desired to remove the positive DC static potential from the skin of the aircraft.

14. The apparatus according to claim 11 wherein the object is an aircraft, the outer structure comprises skin of the aircraft, further comprising:
at least one negative charge dissipating rod extending rearward from the ground section for dissipating negative electrical charges during flight.

15. The apparatus according to claim 11 wherein the object is an aircraft, the outer structure comprises skin of the aircraft, further comprising:
at least one negative charge dissipating rod extending rearward from the ground section for dissipating negative electrical charges during flight;
at least one positive charge dissipating rod extending rearward from a portion of the aircraft; and
switch means for electrically disconnecting the positive charge dissipating rod from the skin when the positive DC static potential is desired on the aircraft, and for electrically connecting the positive charge dissipating rod to the skin during flight when it is desired to remove the positive DC static potential from the skin of the aircraft.

16. In an aircraft having a skin, an improved apparatus for reducing radar reflectivity of the aircraft, comprising in combination:

static charge means for selectively creating a positive DC static potential in excess of 200,000 volts; and mounting means for mounting the static charge means to the aircraft for applying the positive DC static potential to at least a portion of the skin of the aircraft.

17. The aircraft according to claim 16 wherein the static charge means comprises at least one Van de Graaf generator.

18. The aircraft according to claim 16 wherein the static charge means comprises:

a pair of pulleys, one of the pulleys being driven, one of the pulleys being of an electrical insulator material and the other of the pulleys being of an electrical conductive material;

a belt of an electrical insulator material extending around the pulleys, which when rotated by the driven pulley, creates positive charges at a positive end of the belt and negative charges at a negative end of the belt;

a collector located adjacent the positive end of the belt and in electrical continuity with said at least a portion of the skin of the aircraft;

a ground section located adjacent the negative end of the belt and electrically isolated from the skin of the aircraft;

positive brush means at the positive end of the belt for picking off the positive charges and applying them to the collector; and negative brush means at the negative end of the belt for picking off the negative charges and applying them to the ground section.

19. The aircraft according to claim 16 wherein the static charge means comprises:

a pair of pulleys, one of the pulleys being driven, one of the pulleys being of an electrical insulator material and the other of the pulleys being of an electrical conductive material;

a belt of an electrical insulator material extending around the pulleys, which when rotated by the driven pulley, creates positive charges at a positive end of the belt and negative charges at a negative end of the belt;

a collector located adjacent the positive end of the belt and in electrical continuity with said at least a portion of the skin of the aircraft;

a ground section located adjacent the negative end of the belt and electrically isolated from the skin of the aircraft;

positive brush means at the positive end of the belt for picking off the positive charges and applying them to the collector;

negative brush means at the negative end of the belt for picking off the negative charges and applying them to the ground section; and at least one negative charge dissipating rod extending rearward from the ground section for dissipating negative electrical charges during flight.

20. The aircraft according to claim 16 wherein:

the static charge means comprises at least one generator having a collector which accumulates positive charges and a ground section which accumulates negative charges;

the mounting means mounts the collector in electrical continuity with said at least a portion of the skin of the aircraft, and mounts the ground section electrically isolated from the skin of the aircraft; and wherein the aircraft further comprises:

at least one negative charge dissipating rod extending rearward from the ground section for dissipating negative electrical charges during flight.

21. The aircraft according to claim 16 further comprising:

at least one positive charge dissipating rod extending rearward from a portion of the aircraft; and switch means for electrically disconnecting the positive charge dissipating rod from the skin when the positive DC static potential is desired on the aircraft, and for electrically connecting the positive charge dissipating rod to the skin during flight when it is desired to remove the positive DC static potential from the skin of the aircraft.

22. The aircraft according to claim 16 wherein:

the static charge means comprises at least one generator having a collector which accumulates positive charges and a ground section which accumulates negative charges;

the mounting means mounts the collector in electrical continuity with said at least a portion of the skin of the aircraft, and mounts the ground section electrically isolated from the skin of the aircraft; and wherein the aircraft further comprises:

at least one negative charge dissipating rod extending rearward from the ground section for dissipating negative electrical charges during flight;

at least one positive charge dissipating rod extending rearward from a portion of the aircraft; and switch means for electrically disconnecting the positive charge dissipating rod from the skin when the positive DC static potential is desired on the aircraft, and for electrically connecting the positive charge dissipating rod to the skin during flight when it is desired to remove the positive DC static potential from the skin of the aircraft.

23. The aircraft according to claim 16 wherein:

the static charge means comprises at least one generator having a collector which accumulates positive charges and a ground section which accumulates negative charges; and the mounting means comprises an electrically insulated housing containing the generator and mounted to the exterior of the aircraft with the collector located at one end of the housing and in electrical continuity with said at least a portion of the skin of the aircraft, and the ground section located at another end of the housing and electrically insulated by the housing from the skin of the aircraft.

24. In an aircraft having a fuselage, wings and a skin covering the fuselage and wings, an improved apparatus for reducing radar reflectivity of the aircraft, comprising in combination:

an electrically insulated housing mounted to each wing; and static charge means located in each housing for selectively creating a positive DC static potential in excess of 200,000 volts, the static charge means having a collector at one end of the housing to which the positive DC static potential is applied, the collector being in electrical continuity with at least a portion of the skin of the aircraft, the static charge means having a ground section located at an opposite end of the housing which is at a negative potential and electrically insulated by the housing from the skin of the aircraft.

25. The aircraft according to claim 24 wherein the aircraft further comprises:
   at least one negative charge dissipating rod extending rearward from the ground section and electrically isolated from the skin of the aircraft for dissipating negative electrical charges from the ground section during flight.

26. The aircraft according to claim 24 further comprising:
   at least one positive charge dissipating rod extending rearward from a portion of the aircraft; and
   switch means for electrically disconnecting the positive charge dissipating rod from electrical contact with the skin when the positive DC static potential is desired on the aircraft, and for electrically connecting the positive charge dissipating rod to the skin during flight when it is desired to remove the positive DC static potential from the skin of the aircraft.

27. The aircraft according to claim 24 wherein the aircraft further comprises:
   at least one negative charge dissipating rod extending rearward from the ground section and electrically isolated from the skin of the aircraft for dissipating negative electrical charges from the ground section during flight;
   at least one positive charge dissipating rod extending rearward from a portion of the aircraft; and
   switch means for electrically disconnecting the positive charge dissipating rod from the skin when the positive DC static potential is desired on the aircraft, and for electrically connecting the positive charge dissipating rod to the skin during flight when it is desired to remove the positive DC static potential from the skin of the aircraft.

28. The aircraft according to claim 24 wherein the static charge means comprises at least one Van de Graaf generator.

29. A method for reducing radar reflectivity of an object which has an outer structure, comprising:
   creating a positive DC static potential; and
   applying the DC static potential to at least a selected portion of the outer structure of the object.

30. The method according to claim 29 wherein the positive DC static potential created is in excess of 200,000 volts.

31. The method apparatus according to claim 29 wherein the positive DC static potential is created by operating at least one Van de Graaf generator.

32. A method for reducing radar reflectivity of an aircraft having a skin, comprising:
   creating a positive DC static potential in excess of 200,000 volts; and
   applying the positive DC static potential to at least a portion of the skin of the aircraft.

33. The method according to claim 32, further comprising:
   providing a ground section electrically insulated from the skin of the aircraft and applying negative electrical charges to the ground section; and
   mounting at least one negative charge dissipating rod to the ground section, and extending rearward therefrom, and dissipating negative electrical charges therefrom during flight.

34. The method according to claim 32, further comprising:
   providing a ground section electrically insulated from the skin of the aircraft and applying negative electrical charges to the ground section;
   mounting at least one negative charge dissipating rod to the ground section, and extending rearward therefrom, and dissipating negative electrical charges therefrom during flight;
   mounting at least one positive charge dissipating rod extending rearward from a portion of the aircraft; and
   electrically disconnecting the positive charge dissipating rod from the skin when the positive DC static potential is desired on the aircraft, and electrically connecting the positive charge dissipating rod to the skin during flight when it is desired to remove the positive DC static potential from the skin of the aircraft.

35. The method apparatus according to claim 32 wherein the positive DC static potential is created by operating at least one Van de Graaf generator.

* * * * *